July 14, 1936.  A. KORSMO  2,047,274

COMBINE REEL

Filed Dec. 14, 1935　　2 Sheets-Sheet 1

INVENTOR.
ALFRED KORSMO
BY
ATTORNEY.

July 14, 1936.  A. KORSMO  2,047,274
COMBINE REEL
Filed Dec. 14, 1935  2 Sheets-Sheet 2

INVENTOR.
ALFRED KORSMO
BY
ATTORNEY.

Patented July 14, 1936

2,047,274

UNITED STATES PATENT OFFICE 2,047,274

COMBINE REEL

Alfred Korsmo, Hopkins, Minn., assignor to Minneapolis-Moline Power Implement Company, Minneapolis, Minn., a corporation of Delaware Application December 14, 1935, Serial No. 54,489

14 Claims. (Cl. 56—220)

This invention relates to grain harvesting machinery of the traveling harvester-thresher type generally designated as combines, and the object is to provide simple, efficient, and practical means to prevent congestion of unthreshed grain at the point where it is delivered, under the action of an auger-conveyor, from the so-called header platform to the feeder housing through which it is conveyed rearwardly into the separating and cleaning mechanism; and to prevent the entangling of such grain with the header reel at the end adjacent said point or zone of delivery into the feeder housing. More particularly, and to attain these ends and purposes, I provide the header reel, at its end which is adjacent to the feeder housing, with an annular series of deflector forming angular plates, which connect the ends of the reel blades, and are so angled that they will cooperate with the auger conveyor, when the latter is operating, to produce a more uniform grain feed action into the feeder housing and thus eliminate the aforementioned congesting and entangling conditions.

The invention is especially adapted to the type of machine disclosed in United States Patent No. 1,959,689, issued May 22, 1934, for Combine, to Martin Ronning (assignor to Minneapolis-Moline Power Implement Company); and attention is directed to said patent for a more detailed and comprehensive understanding of the entire machine, much of which has here been omitted as not being pertinent to a consideration of the present invention.

In the accompanying drawings, which illustrate a preferred embodiment of the invention:

Figures 1, 2:
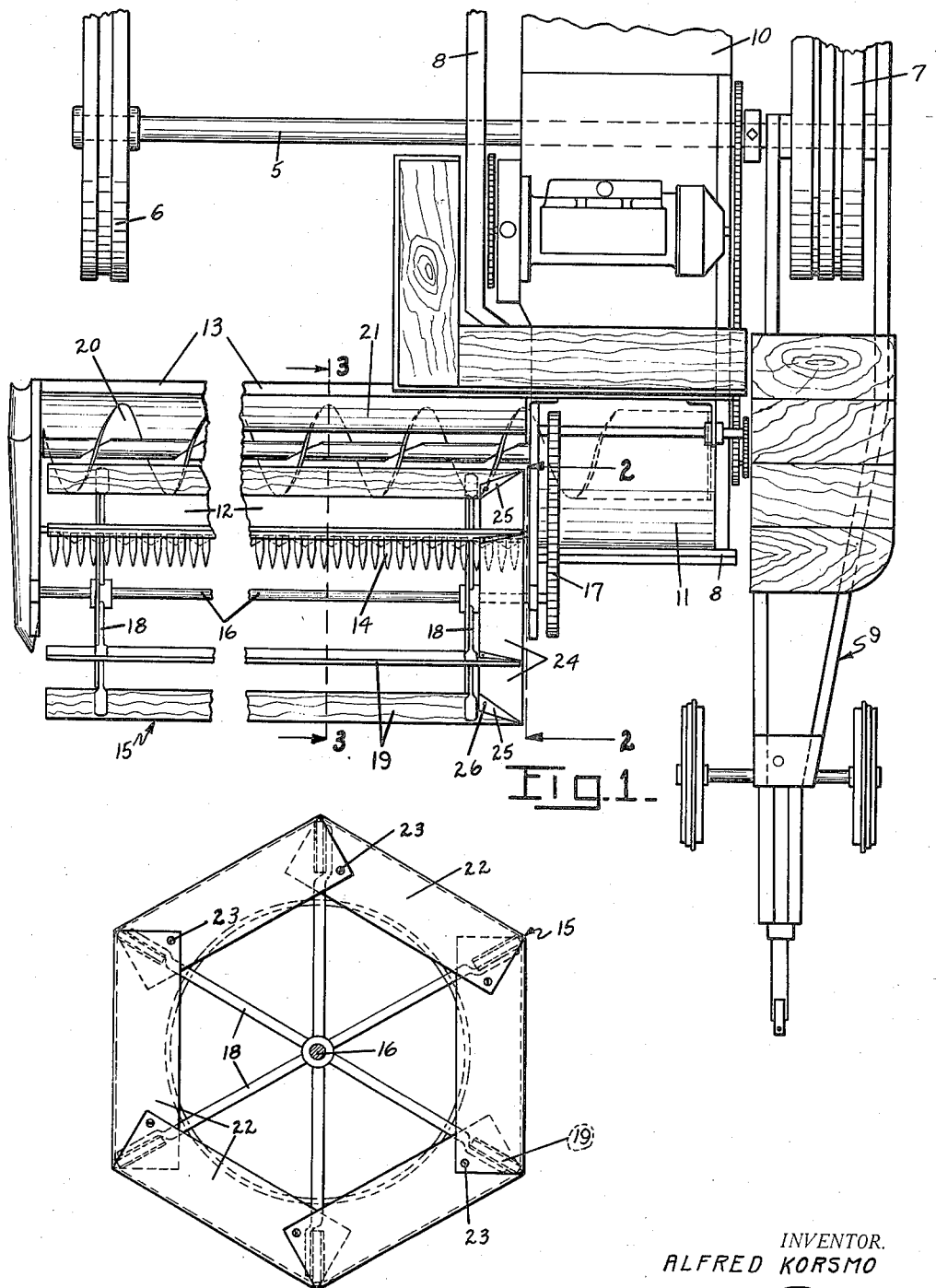
Fig. 1 is a plan view of a combine embodying my invention with various parts removed, and others broken away, to simplify consideration of the novel features.
Fig. 2 is an enlarged detail end view of the header reel, as on the line 2—2 in Fig. 1.

Referring to the drawings more particularly and by reference characters, 5 designates a main axle supported on ground wheels 6 and 7, and in turn forms the primary support for the machine. The machine includes a main frame 8, which is tiltable on the axle 5, and carries the harvester unit proper forwardly of the axle while the major portion of the thresher unit is carried rearwardly of the axle in such a manner that the two units will substantially counterbalance each other to facilitate vertical adjustment of the harvester cutter bar with respect to the ground. Such adjustments may be made by connections (not shown) with and in respect to a draft truck 9 disposed at one side of the machine.

The thresher unit mechanism is not illustrated in detail but includes a longitudinally or forwardly extending housing 10 terminating in a hood 11, which is open at the harvester side to receive cut but unthreshed grain therefrom. As the grain is received into this hood it is engaged and conveyed back into the separating and cleaning mechanism.

The harvester unit, as shown, is of the so-called header type which severs from the standing crop only enough of the straw or grain stem to insure removal of all the heads, and comprises a receiving platform 12 which terminates rearwardly in a back wall 13. At its front edge the receiving platform 12 has the usual sickle or cutter mechanism 14 for severing the crop from the field, and to assist in brushing or pushing the grain back onto the platform 12 there is provided the usual reel, designated generally by the numeral 15. This reel includes an axial shaft 16, driven by chain 17, and radial spokes 18 to the outer ends of which are secured the grain engaging blades or bars 19.

As the crop cut by sickle 14 is moved rearwardly by the reel 15 over the platform 12 it is engaged by an auger or screw conveyor 20, journaled over the platform, and this conveyor is rotated in a direction that will feed the crop material into the hood 11 where it may be engaged and conveyed rearwardly into the thresher. To this end the conveyor extends into the housing hood 11 through the open side thereof, and to further insure proper feed action of the conveyor there is provided a stripper plate 21 that extends forwardly from and is secured to the wall 13. This plate 19 tends to prevent the grain from twisting about the auger and directs the material toward and into the housing portion 11 as the auger rotates.

Figure 3:
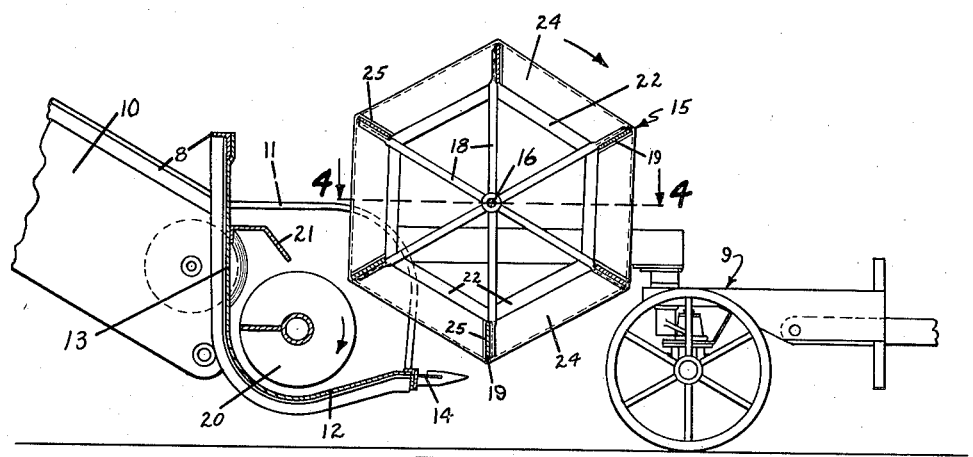
Fig. 3 is a sectional elevation on line 3—3 in Fig. 1.

The parts and arrangements thus far described are not new in the art, being evidenced for instance by the aforementioned Ronning Patent No. 1,959,689, but have been shown in order that the present invention may be fully understood. The difficulty that has been encountered, and which occurs with the harvesting of certain grains and under certain heavy crop cutting conditions, is that there develops a tendency for the material to choke up in the hood opening, and as the ends of the reel blades 19 must pass this opening (see Fig. 3) such accumulated crop material not only unduly resists reel rotation but by engaging the reel blade ends is carried up by the rear or upwardly moving side of the reel, and thereupon proceeds to become entangled with the reel and results in annoyance and delays.

To overcome these objections and difficulties I provide the reel 15, at its end adjacent the hood 11, with a series of angularly formed plates which are secured to and connect adjacent pairs of the reel blades 19. These plates include portions 22 which abut against the ends of reel blades and have overlapping ends secured together by bolts or rivets 23 (Fig. 2) so as to lie in a substantially common vertical plane. These plate portions 22 are integral with other portions 24, which they thus reinforce and brace against distorting or bending pressure, and also serve to prevent crop material from being crowded endwise into the reel blades as the latter pass the opening in the hood 11.

Figure 4:
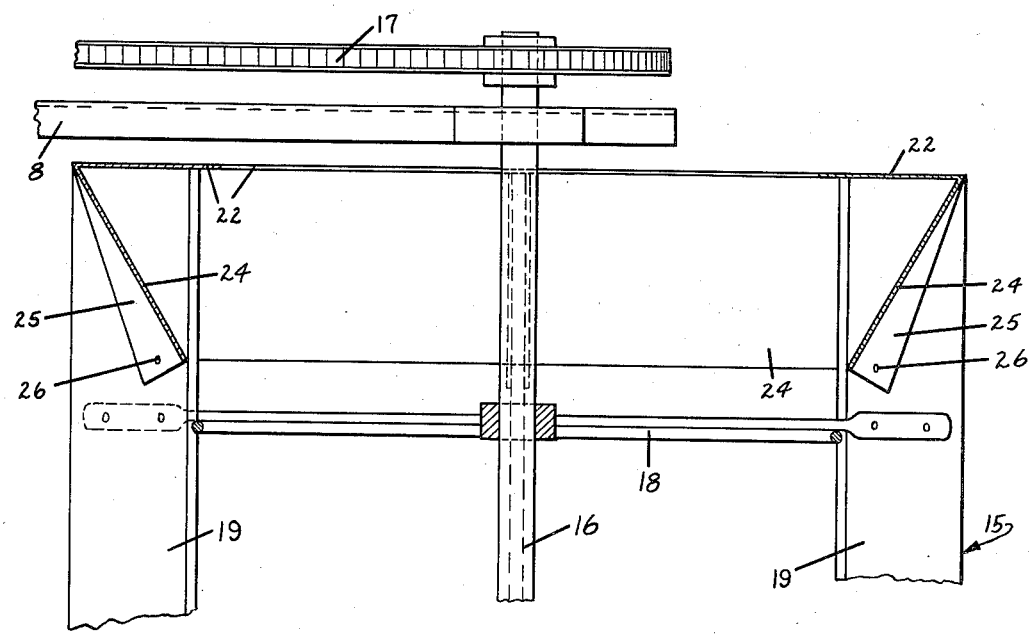
Fig. 4 is an enlarged section on line 4—4 in Fig. 3.

The plate portions 24 are all angularly disposed with respect to the shaft 16 and extend in to the inner edges of the blades 19, as shown in Fig. 4, with a result that in the aggregate they form a frusto-pyramidal deflector that rotates with and on the axis of the reel. The plate portions 24 have angularly formed end flanges 25, which are fastened against opposite faces of the blades 19, as by bolts or rivets 26, thus further uniting the parts rigidly together.

In the operation of the machine the deflector members will in no way interfere with the proper functioning of the reel to sweep or bend the crop into contact with the sickle 14 and then pass it over the platform 12 into contact with the screw conveyor 20. It is found, however, that the device is very effective to overcome the difficulties previously mentioned. The crop material moving into the hood opening contacts the plates 24 in such a manner and at such angle that the material is crowded toward the auger 20 until it is well within the hood, and of course further cooperates with the plates 22 to prevent the grain from entangling with or being carried over forwardly by the reel parts.

It is understood that suitable modifications may be made in the structure as disclosed, provided such modifications come within the spirit and scope of the appended claims. Having now therefore fully illustrated and described my invention, what I claim to be new and desire to protect by Letters Patents is:

1. In a combine having a thresher with a lateral crop receiving opening and a harvester delivering cut crop transversely into the thresher opening, said harvester having a transverse, rotatable reel for acting on the standing crop as the machine moves forwardly, said reel being provided at one end, adjacent said opening, with means for deflecting the crop from entangling engagement with said reel end.

2. In a combine having a threasher with a lateral crop receiving opening and a harvester delivering cut crop transversely into the thresher opening, said harvester having a transverse, rotatable reel for acting on the standing crop as the machine moves forwardly, said reel being provided at one end, adjacent said opening, with deflecting means tending to crowd the crop material away from said reel end as such crop material is delivered into the thresher opening.

3. In a combine having a thresher housing with a lateral crop receiving opening; a harvester disposed adjacent to the opening and including a platform to receive cut crop material, a conveyor for conveying the material over the platform and through said opening into the thresher housing, and a reel rotatable over and in front of the platform; and means at one end of the reel, adjacent said opening, for crowding the material toward the conveyor as it approaches said opening.

4. In a combine having a thresher housing with a lateral crop receiving opening; a harvester disposed adjacent to the opening and including a platform to receive cut crop material, a conveyor for conveying the material over the platform and through said opening into the thresher housing, and a reel rotatable over and in front of the platform; and a frusto-conical device for axial rotation with one end of the reel to act on the material conveyed to said housing opening and deflect such conveyed material from engagement with the reel.

5. In a combine having a thresher housing with a lateral crop receiving opening; a harvester disposed adjacent to the opening and including a platform to receive cut crop material, a conveyor for conveying the material over the platform and through said opening into the thresher housing, and a reel rotatable over and in front of the platform; and angularly disposed deflecting means for acting on the conveyed material as it approaches said housing opening to remove the material from entangling contact with the adjacent reel end.

6. In a combine having a thresher housing with a lateral crop receiving opening; a harvester disposed adjacent to the opening and including a platform to receive cut crop material, a conveyor for conveying the material over the platform and through said opening into the thresher housing, a reel rotatable over the platform and having peripherally spaced, longitudinal blades for acting on standing crop as the machine moves forwardly; and a series of crop deflector plates secured to said reel blades at the end thereof adjacent said housing opening.

7. In a combine having a thresher housing with a lateral crop receiving opening; a harvester disposed adjacent to the opening and including a platform to receive cut crop material, a conveyor for conveying the material over the platform and through said opening into the thresher housing, a reel rotatable over the platform and having peripherally spaced, longitudinal blades for acting on standing crop as the machine moves forwardly; and a series of crop deflector plates secured to said reel blades at the end thereof adjacent said housing opening, each of said plates being secured at opposite ends to two of the reel blades.

8. In a combine having a thresher housing with a lateral crop receiving opening; a harvester disposed adjacent to the opening and including a platform to receive cut crop material, a conveyor for conveying the material over the platform and through said opening into the thresher housing, a reel rotatable over the platform and having peripherally spaced, longitudinal blades for acting on standing crop as the machine moves forwardly; and a series of crop deflector plates secured to said reel blades at the end thereof adjacent said housing opening, said plates all being disposed at oblique angles with respect to the reel axis.

9. The combination with a combine reel having peripherally spaced, parallel, crop engaging bars of a generally circular series of deflector plates each connecting two of said bars at one end of the reel and for deflecting crop material from said reel end as the reel rotates.

10. The combination with the harvester reel of a combine, of a series of deflector plates carried by the reel and for deflecting crop material from one end thereof as the reel rotates, said plates having face portions disposed at oblique angles with respect to the reel axis so as to outwardly deflect crop material moving parallel with the reel axis.

11. The combination with the harvester reel of a combine, of a series of deflector plates carried by the reel and for deflecting crop material from one end thereof as the reel rotates, said plates having portions disposed at oblique angles with respect to the reel axis, and other portions disposed against the end of the reel perpendicularly with respect to the axis of rotation.

12. The combination with the harvester reel of a combine, said reel being provided with peripherally spaced, longitudinally extending grain engaging members, of a series of deflector plates at one end of the reel, each of said plates being secured to and between an adjacent pair of the members.

13. The combination with the harvester reel of a combine, said reel being provided with peripherally spaced, longitudinally extending grain engaging members, of a series of deflector plates at one end of the reel, each of said plates being secured to and between an adjacent pair of the members, and each of said plates being formed with an integral angularly projecting reinforcing flange.

14. The combination with the harvester reel of a combine, said reel being provided with peripherally spaced, longitudinally extending grain engaging members, of an annular series of deflector plates secured to one end of the reel and with each plate connecting the ends of two of said members, said plates being provided with integral flanges, and means securing the flange of each plate to the flange of an adjacent plate.

ALFRED KORSMO.